W. Boyce,
Filter.
No. 98,343.   Patented Dec. 28, 1869.
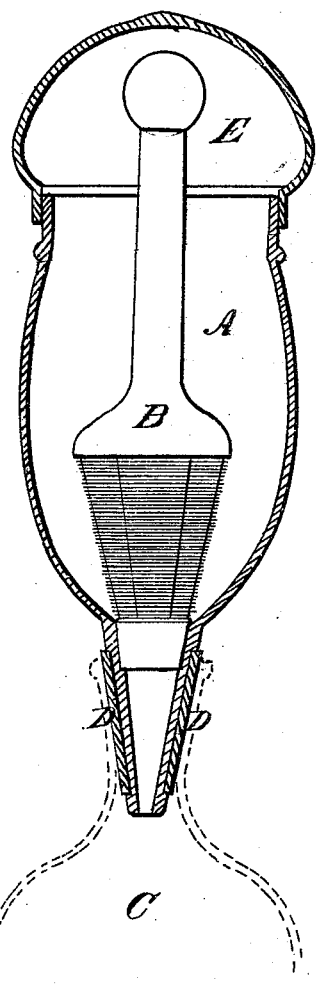
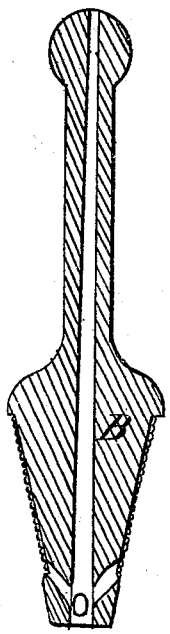
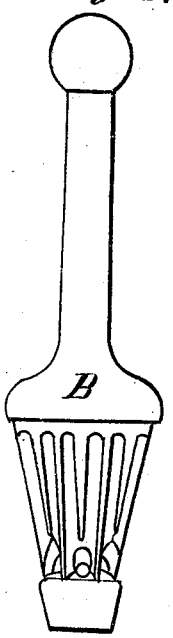
Witnesses:
Harry King
F. A. Lehmann
Inventor:
Washington Boyce
per
Alexander Mason
Atty

United States Patent Office.

WASHINGTON BOYCE, OF TUSCOLA, ILLINOIS.

Letters Patent No. 98,343, dated December 28, 1869; antedated December 17, 1869.

---

IMPROVED APPARATUS FOR FILTERING VOLATILE LIQUIDS.

---

The Schedule referred to in these Letters Patent and making part of the same.

---

*To all whom it may concern:*

Be it known that I, WASHINGTON BOYCE, of Tuscola, in the county of Douglas, and in the State of Illinois, have invented certain new and useful Improvements in Filters; and do hereby declare that the following is a full, clear, and exact description thereof, reference being had to the accompanying drawings, and the letters of reference marked thereon.

The object of my invention is to provide a filter for nearly every liquid, but more especially for those light, volatile fluids, such as collodion and varnishes, which evaporate rapidly upon being exposed to the air.

Whenever an attempt is made to filter one of these fluids in the ordinary method, a large proportion is lost by evaporation, and it is to prevent this loss that my invention is intended.

Figure 1 represents a section view of my invention, as it appears when placed in the neck of the bottle or receiver.

Figure 2 is a section view of the plunger, showing the openings near its bottom, and the perforation extending through its whole length.

Figure 3 is a side view of the plunger, with the floss or wrapping-material removed.

Letter A represents the cup, into which the fluid to be filtered is placed, and it may either be of the shape shown in the drawings, or any other suitable one, and can be constructed of wood, glass, metal, or gutta-percha.

Inside of this cup A is placed the plunger B, which is provided with a perforation extending from top to bottom, so as to allow the air, displaced by the fluids flowing into the bottle, to rise up into the cup. The lower end of this plunger is ground so as to fit, air-tight, into its seat in the lower part of the cup A, as seen in fig. 1. The lower half of this plunger is much larger than the upper one, and is shaped like a cone, having small grooves cut into its sides, running downward to the small holes, through which the fluids flow into the bottles, as shown in fig. 3. Around this cone there is placed a wrapping of floss, silk, cotton, or any suitable material that can be used for filtering-purposes, so as to allow the fluid to flow freely into the receiver beneath, and keep all the coarser parts in the cup.

In order to prevent the atmosphere from coming into contact with the fluid in the bottle or receiver C, after having passed through the filter, a rubber band, D, is placed around the lower end of the cup A, where it comes into contact with the neck of the bottle.

Letter E represents a movable cover for the cup A, which is made to fit air-tight, and can either be made in this shape, or ground so as to fit in a socket, and is provided so as to prevent access of the air to the liquid while being filtered.

Having thus described my invention,

What I claim, and desire to secure by Letters Patent, is—

1. The cup A, provided with the movable cover E and rubber band D, so as to form an air-tight connection with the bottle or receiver C.

2. The perforated plunger B, the lower end of which is shaped like a cone, and which is provided with the grooves and openings, in the manner and for the purpose specified.

3. In combination with the above plunger, the floss, silk, or cotton wrappings, when used in the manner and for the purpose specified.

4. The combination of the cup A and the plunger B, when used in the manner and for the purpose specified.

In testimony that I claim the foregoing, I have hereunto set my hand, this 30th day of March, 1869.

WASHINGTON BOYCE.

Witnesses:
A. G. WALLACE,
M. STOOPS.